(12) United States Patent
Greaves

(10) Patent No.: US 6,612,604 B2
(45) Date of Patent: Sep. 2, 2003

(54) TOW BAR APPARATUS

(76) Inventor: John Greaves, 190 Wilson Blvd. North, Naples, FL (US) 34120-2073

( * ) Notice: Subject to any disclaimer, the term of this patent is extended or adjusted under 35 U.S.C. 154(b) by 0 days.

(21) Appl. No.: 10/337,695

(22) Filed: Jan. 7, 2003

(65) Prior Publication Data

US 2003/0094786 A1 May 22, 2003

Related U.S. Application Data

(60) Division of application No. 09/834,073, filed on Apr. 11, 2001, now Pat. No. 6,502,847, which is a continuation-in-part of application No. 09/302,543, filed on Apr. 30, 1999, now abandoned.

(51) Int. Cl.[7] .................................................. B60D 1/14
(52) U.S. Cl. ..................... 280/494; 280/402; 280/456.1; 280/511
(58) Field of Search ............................. 280/402, 456.1, 280/492, 493, 494, 511, 512, 513

(56) References Cited

U.S. PATENT DOCUMENTS

| | | | |
|---|---|---|---|
| 1,185,435 A | 5/1916 | Powell | |
| 2,071,883 A | 2/1937 | La Hodny | |
| 2,139,970 A | 12/1938 | Moore | |
| 2,440,877 A * | 5/1948 | Russell | 280/505 |
| 2,486,483 A | 11/1949 | Landen | |
| 2,522,793 A * | 9/1950 | Koeckritz | 280/494 |
| 2,916,301 A | 12/1959 | Cushman | |
| 3,000,652 A | 9/1961 | Hawkins | |
| 5,112,074 A * | 5/1992 | Smith | 280/483 |
| 5,516,140 A | 5/1996 | Hinte | |
| RE35,482 E | 3/1997 | Johnson | |
| 5,765,851 A | 6/1998 | Parent | |
| 5,873,595 A | 2/1999 | Hinte | |
| 5,909,887 A | 6/1999 | Hobrath | |
| 6,168,182 B1 | 1/2001 | Ford | |

* cited by examiner

Primary Examiner—Kevin Hurley
(74) Attorney, Agent, or Firm—Eric Karich

(57) ABSTRACT

A tow bar apparatus, that allows a towing vehicle to tow a towed vehicle, has a hitch member, a pair of tow bars, and a pair of socket members. The hitch member is adapted to engage a tow bar receiver of the towing vehicle. The pair of socket members are adapted to be attached to the towed vehicle. Each of the pair of tow bars includes a plate ball member at a first end for pivotally engaging one of the pair of socket members. Each of the pair of tow bars further includes a second end, the second ends of the pair of tow bars being joined to form a hitch ball member that pivotably and rotatably engages the hitch member.

8 Claims, 5 Drawing Sheets

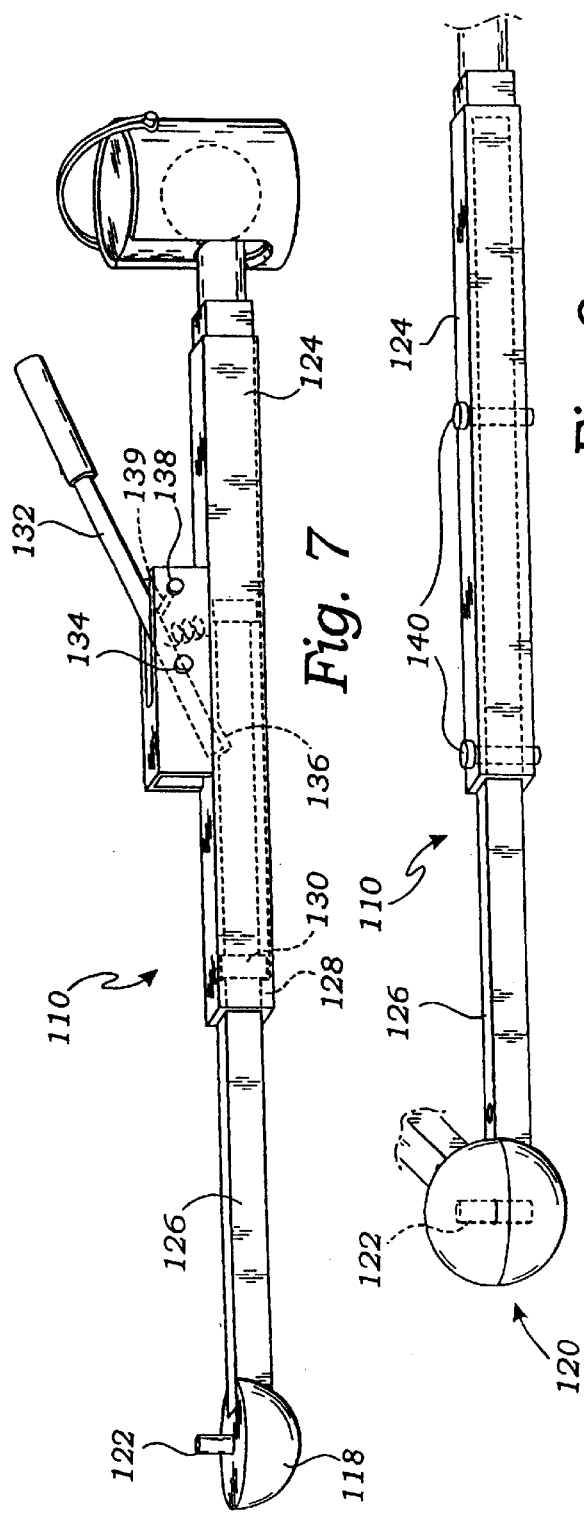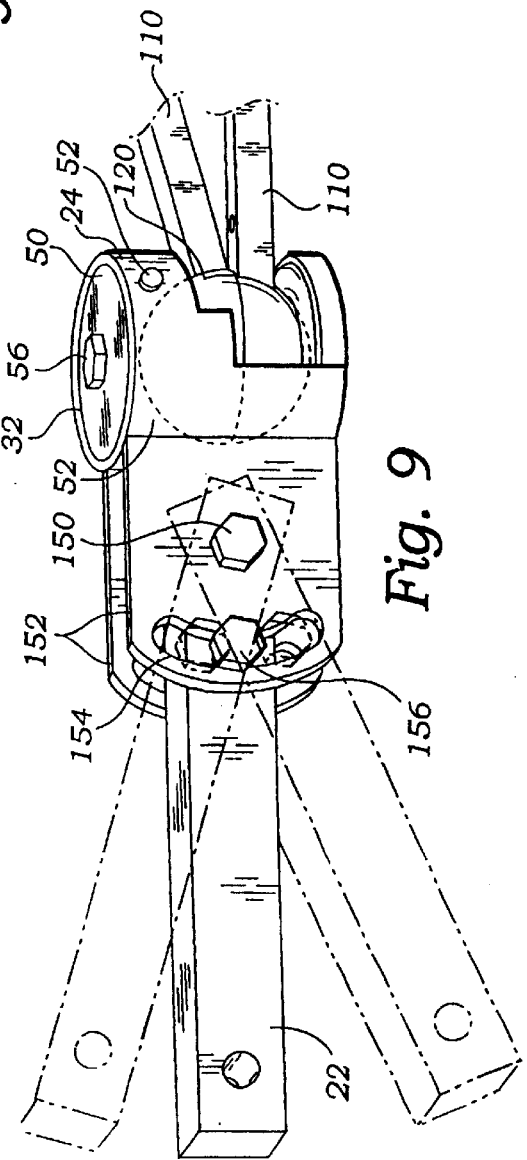

TOW BAR APPARATUS

CROSS-REFERENCE TO RELATED APPLICATIONS

This application for a divisional of previously filed utility patent application Ser. No. 09/834,073, filed Apr. 11, 2001, registered on Jan. 7, 2003 as U.S. Pat. No. 6,502,847, which is a continuation-in-part of a previously filed utility patent, now abandoned, having the application Ser. No. 09/302,543, filed Apr. 30, 1999 now abandoned.

STATEMENT REGARDING FEDERALLY SPONSORED RESEARCH

Not Applicable

BACKGROUND OF THE INVENTION

1. Field of the Invention

This invention relates generally to tow bars, and more particularly to a tow bar apparatus that allows the towed vehicle a great range of motion relative to the towing vehicle while still providing a strong connection between the two vehicles.

2. Description of Related Art

Tow bars that bolt directly onto a towing vehicle for towing a towed vehicle also well known in the prior art. Examples of such tow bars are shown in Parent, U.S. Pat. No. 5,765,851, and Johnson, U.S. Re. Pat. No. 35,482, which are described in greater detail below. While these tow bars are superior to a ball hitch, these tow bars are both bulky and relatively expensive to manufacture. To provide the flexibility necessary to allow the towed vehicle a range of motion relative to the towing vehicle, most prior art tow bars include three hinged connections, one hinge providing flexibility in the horizontal plane, a second hinge providing flexibility in the vertical plane, and a third hinge that provides a pivotal point for twisting. While these hinges are functional, they are also weak points in the tow bar that could break under rigorous conditions.

It is also known to substitute at least one of the hinged connections with a ball-and-socket connection. Examples of this are shown in R. E. Moore, U.S. Pat. No. 2,139,970 and J. E. Powell, U.S. Pat. No. 1,185,435. Moore teaches a tow bar that uses three ball-and-socket connections similar to the present invention; however, Moore does not teach ball-and-socket connections that are similar to the present invention. In Moore, the ball-and-socket connections are designed to be permanent, and the sockets are removably attachable to the vehicles. This is not a structurally reliable configuration. The novel ball-and-socket connections disclosed in the present invention enable the tow bar to be even stronger and more reliable than prior art tow bars, and yet still easily removable when not in use.

Powell teaches a similar tow bar that only uses a single ball-and-socket connection. Powell suffers from the same disadvantages as Moore, and does not provide the strength required in combination with the easy disconnection of the ball-and-socket connection.

W. W. Cushman, U.S. Pat. No. 2,916,301, teaches warehouse tractors and the like and has for its primary object to so modify the pusher plate on such vehicles that the latter may be readily connected together as a train and be pulled to and from the place of work by a leading vehicle. While Cushman teaches the use of a pair of bars that terminate in hemispheres that can be joined to form a single unit, the hemispheres of Cushman are not positioned within a ball-and-socket connection. In Cushman, the hemispheres are part of a jack mechanism that merely push against a half-socket for the purposes of depressing the drawbar tongue and raising the tractor. Cushman does not teach the combination of two hemispheres within a complete socket to form a ball-and-socket connection that can withstand both pushing and pulling forces.

W. La Hodny, U.S. Pat. No. 2,071,883, teaches a ball-and-socket connection that is somewhat similar to the present invention; however, this reference is in the field of rear view mirrors. To the extend Hodney is instructive of the present invention, it would not be obvious to apply the teachings of this field to the field of towing vehicles. Rear view mirrors must be adjustable in all three dimensions, but they do not have to be very strong. Designs that might be highly adjustable, and functional for rear view mirrors, would not often be capable of withstand the rigorous pushing and pulling strains that are placed on a tow bar apparatus.

Parent, U.S. Pat. No. 5,765,851, teaches a storable self-aligning towing assembly which allows universal pivoting about three axes between a towing vehicle and a towed vehicle. The towing assembly is self-supporting. A hitching member is releasably attached to a towing vehicle at a first end of the hitching member; a first yoke member is pivotally attached to a second end of the hitching member such that the first yoke member pivots about a first axis which is generally horizontal and is normal an extended longitudinal axis of the hitching member; a second yoke member is connected to the first yoke member such that the second yoke member is free to rotate with respect to the first yoke member about an axis that is generally parallel to an extended longitudinal axis of the hitching member; a towed vehicle attachment means is releasably attached at a first end to a towed vehicle; the towed vehicle attachment means is pivotally attached to the second yoke member such that the second yoke member pivots with respect to the towed vehicle attachment means about a second axis which is generally vertical axis and is normal to the extended longitudinal axis of the hitching member. The configuration allows the towing assembly to pivot from a towing position to a storage position on the rear of the towing vehicle. A latching mechanism secures the self-aligning towing assembly in the storage position on the rear of the towing vehicle. The self-aligning towing assembly may be further converted into a shipping position.

Johnson, U.S. Re. Pat. No. 35,482, teaches a towing hitch including a frame having a forward portion selectively connected to the receiver hitch of a towing vehicle, and a rearward portion having a pair of elongated bars pivotally connected thereto for removable connection to a vehicle to be towed. Each bar has a pivot arm connected to the rearward end thereof, said pivot arms and bars all to the rearward end thereof, said pivot arms and bars all pivotal within a single plane, so that the pivot arms may be folded into a storage position adjacent and parallel to the bars. Selective locking apparatus permits the pivot arms to be extended to a towing position aligned with the bars and locked in the towing position. The bars are pivotally connected to a pivot block which is pivotally mounted to the forward portion of the frame, so as to permit the pivot block, and attached bars and arms to pivot from a generally horizontal position to a generally vertical storage position. The pivot block is mounted on a rotatable yoke, such that the bars and pivot arms are rotatable, as a unit, along an axis parallel to the direction which a vehicle is being towed.

Hobrath, U.S. Pat. No. 5,909,887, teaches a sulky for a self propelled lawn mower, the sulky being interconnected by a pivot frame and a horizontal pivot to the mower frame, and a vertical pivot between the sulky frame and wheels in order to retain the operator in a constant position in respect to the mower under all operator conditions.

The prior art teaches tow bars with flexibility between the towed and towing vehicle. However, the prior art does not teach a tow bar having three ball-and-socket connections that allow a towed vehicle a great range of motion relative to the towing vehicle, while still providing a strong connection that will not break even under rigorous towing and braking conditions. The prior art does not teach the use of two hemispheres that join within a socket to form a ball-and-socket connection. The prior art also does not teach a pair of socket members that enable a removable ball-and-socket connection between the tow bar and the towed vehicle. The present invention fulfills these needs and provides further related advantages as described in the following summary.

SUMMARY OF THE INVENTION

The present invention teaches certain benefits in construction and use which give rise to the objectives described below.

The present invention provides a tow bar apparatus that allows a towing vehicle to tow a towed vehicle. The tow bar apparatus includes a hitch member, a pair of tow bars, and a pair of socket members. The hitch member is adapted to engage a tow bar receiver of the towing vehicle. The pair of socket members are adapted to be attached to the towed vehicle. Each of the pair of tow bars includes a plate ball member at a first end for pivotally engaging one of the pair of socket members. Each of the pair of tow bars further includes a second end, the second ends of the pair of tow bars being joined to form a hitch ball member that pivotably and rotatably engages the hitch member.

A primary objective of the present invention is to provide a tow bar apparatus having advantages not taught by the prior art.

Another objective is to provide a tow bar apparatus that allows the towed vehicle a great range of motion relative to the towing vehicle, without weakening the strength of the tow bar.

A further objective is to provide a tow bar apparatus that includes a pair of tow bars, each of the pair of tow bars having a hemisphere at a second end, the two hemispheres being joined within a hitch socket member to form a ball-and-socket connection.

A further objective is to provide a tow bar apparatus that includes a pair of socket members that enable a removable ball-and-socket connection between the tow bar and the towed vehicle.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 7 is a perspective view of a first alternative embodiment of one of the pair of tow bars;

FIG. 8 is a perspective view of a second alternative embodiment of one of the pair of tow bars;

FIG. 9 is a front perspective view of an alternative embodiment of the hitch member.

DETAILED DESCRIPTION OF THE INVENTION

Figure 1:
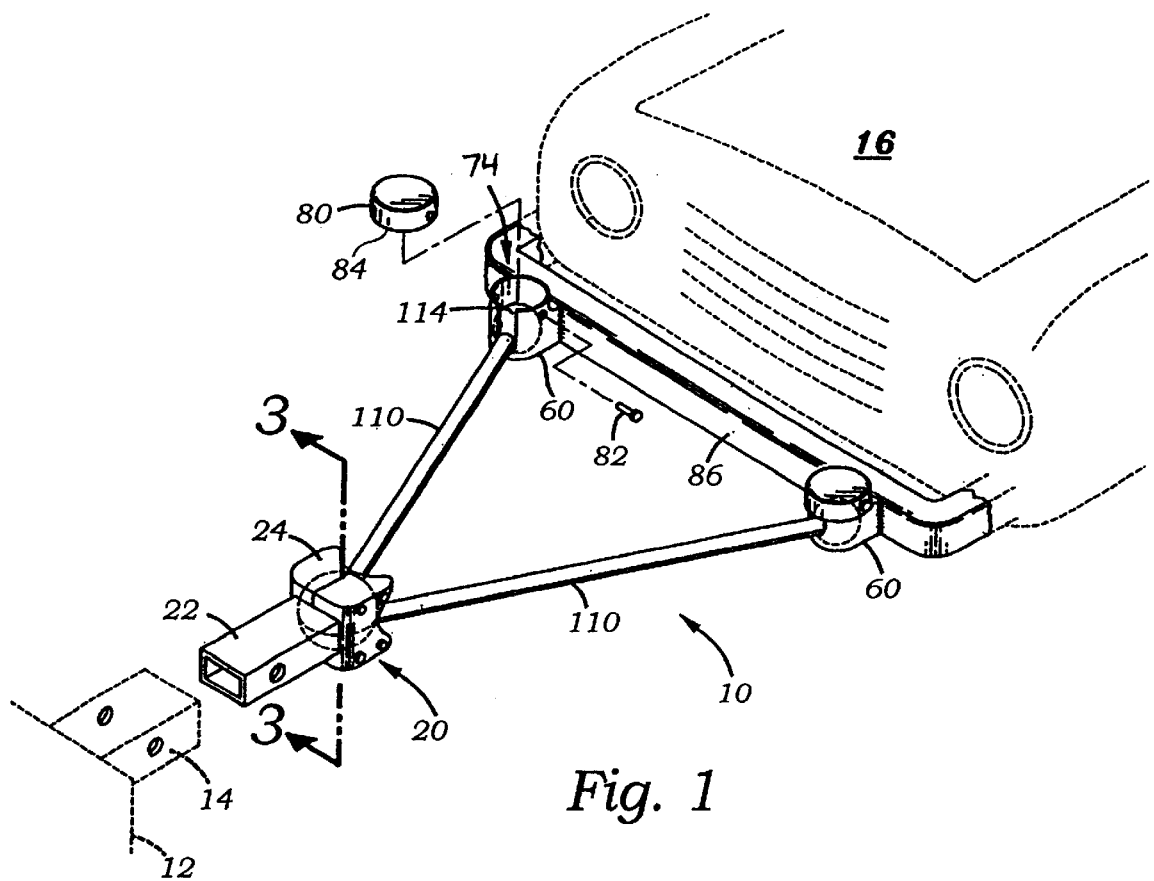
FIG. 1 is a perspective view of the preferred embodiment of the present invention.

The above-described drawing figures illustrate the invention, a tow bar apparatus 10 for use by a towing vehicle 12 to tow a towed vehicle 16. As shown in FIG. 1, the tow bar apparatus 10 includes a hitch member 20, a pair of socket members 60, and a pair of tow bars 110. The hitch member 20 is adapted to engage a tow bar receiver 14 of the towing vehicle 12. The pair of socket members 60 is adapted to be attached to the towed vehicle 16. Each of the pair of tow bars 110 includes a plate ball member 114 at a first end 112 for pivotally engaging one of the pair of socket members 60. Each of the pair of tow bars 110 further includes a second end 116, the second ends 116 of the pair of tow bars 110 being joined to form a hitch ball member 120 that pivotably and rotatably engages the hitch member 20.

Hitch Member

As shown in FIG. 1, the hitch member 20 includes a hitching portion 22 and a hitch socket member 24. The hitching portion 22 is shaped to slidably engage a tow bar receiver 14 of the towing vehicle 12 so that a hitch locking bolt (not shown) can be used to lock the hitching portion 22 to the tow bar receiver 14 of the towing vehicle 12. This hitching mechanism is well known in the art, and is disclosed in greater detail in Johnson, U.S. Re. Pat. No. 35,482, and Parent, U.S. Pat. No. 5,765,851, hereby incorporated by reference. While the hitching portion 22 illustrated in FIG. 1 is the preferred embodiment, those skilled in the art can modify the hitching portion 22 to connect the hitch member 20 to the towing vehicle 12 in a variety of ways, including but not limited to the following: a trailer-hitch shape to connect to a ball hitch, well known in the prior art; a locking mechanism as shown in Moore, U.S. Pat. No. 2,139,970, and Hawkins, U.S. Pat. No. 3,000,652, hereby incorporated by reference; and directly connecting the hitch member 20 to the towing vehicle 12 by welding, bolting, or equivalent means. It is preferred, however, that the hitch member 20 be readily removable from the towing vehicle 12 so that the tow bar apparatus 10 can readily be removed from the towing vehicle 12 when not in use.

Hitch Socket Member

Figure 3:
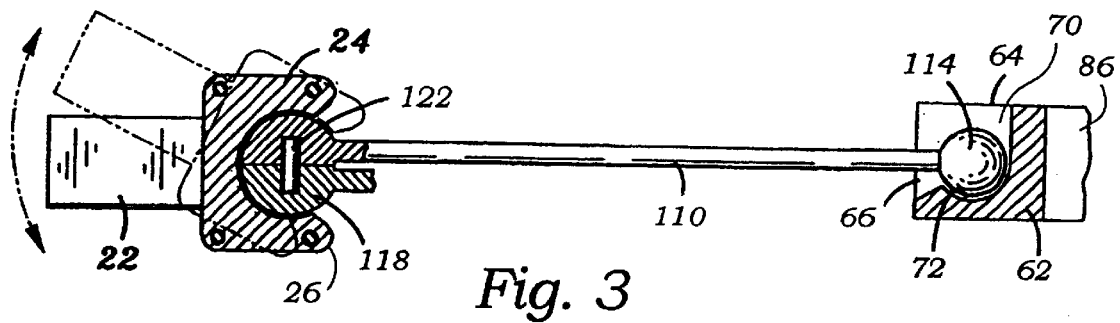
FIG. 3 is a sectional view thereof taken along line 3—3 in FIG. 1, showing a hitch member in phantom after it has pivoted vertically with respect to the tow bar.
Figure 4:
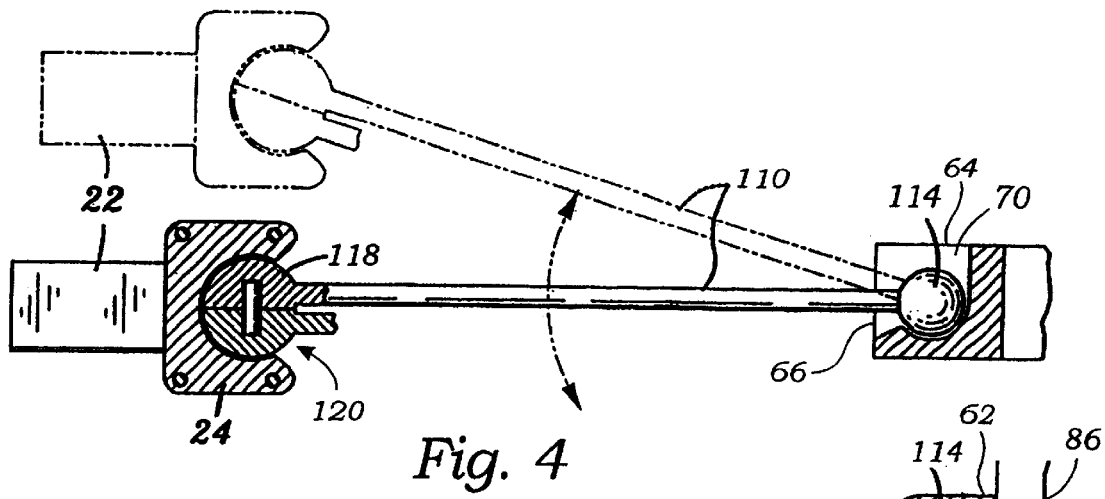
FIG. 4 is a sectional view thereof taken along line 3—3 in FIG. 1, showing the hitch member and the tow bar in phantom after they have pivoted vertically with respect to a plate socket member.
Figure 5:
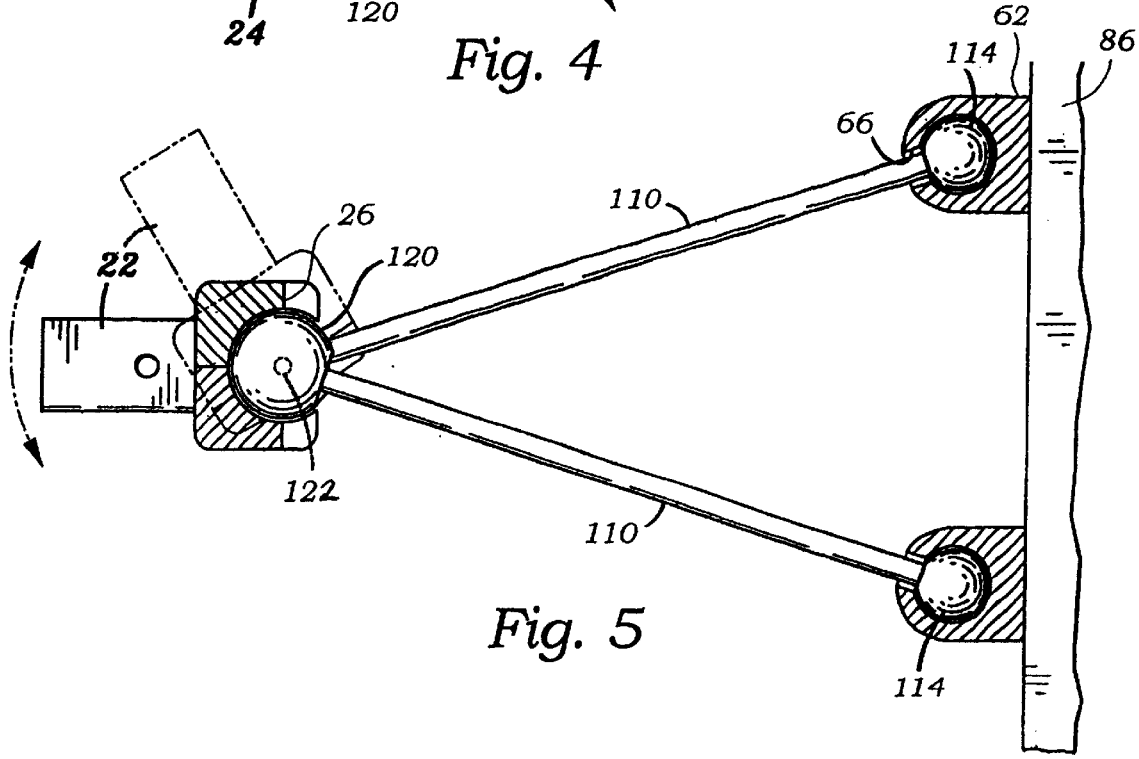
FIG. 5 is a top plan view of the invention showing the hitch member in phantom after it has pivoted horizontally with respect to the tow bar.

As shown in FIG. 1, the hitch socket member 24 is shaped to form a ball-and-socket relationship with the second end 116 of each of the pair of tow bars 110, as described in greater detail below. As shown in FIG. 3, to enable this relationship the hitch socket member 24 includes a hitch socket peripheral lip 26 that defines a hitch socket central aperture 28 that communicates with a hitch socket internal chamber 30 of the hitch socket member 24. As shown in FIGS. 3–5, the hitch socket member 24 allows the hitch ball member 120 a wide range of motion in yaw, pitch, and roll axes.

In a first embodiment, as shown in FIG. 1, the hitch socket member 24 is formed in two steel parts that are welded, bolted, or otherwise fastened together around the hitch ball member 120. In this embodiment, the hitch socket member 24 functions to contain the hitch ball member 120, so it is important that the hitch socket central aperture 28 be smaller than the hitch ball member 120. The hitch ball member 120 is inserted into the hitch socket internal chamber 30 during the manufacture of the hitch socket member 24. It is preferred that a plastic component be included to prevent metal-to-metal contact within the connection. Either the hitch socket member 24 or the hitch ball member 120 can be constructed of high strength plastic, or a separate insert can be used, as described below.

Figure 10:
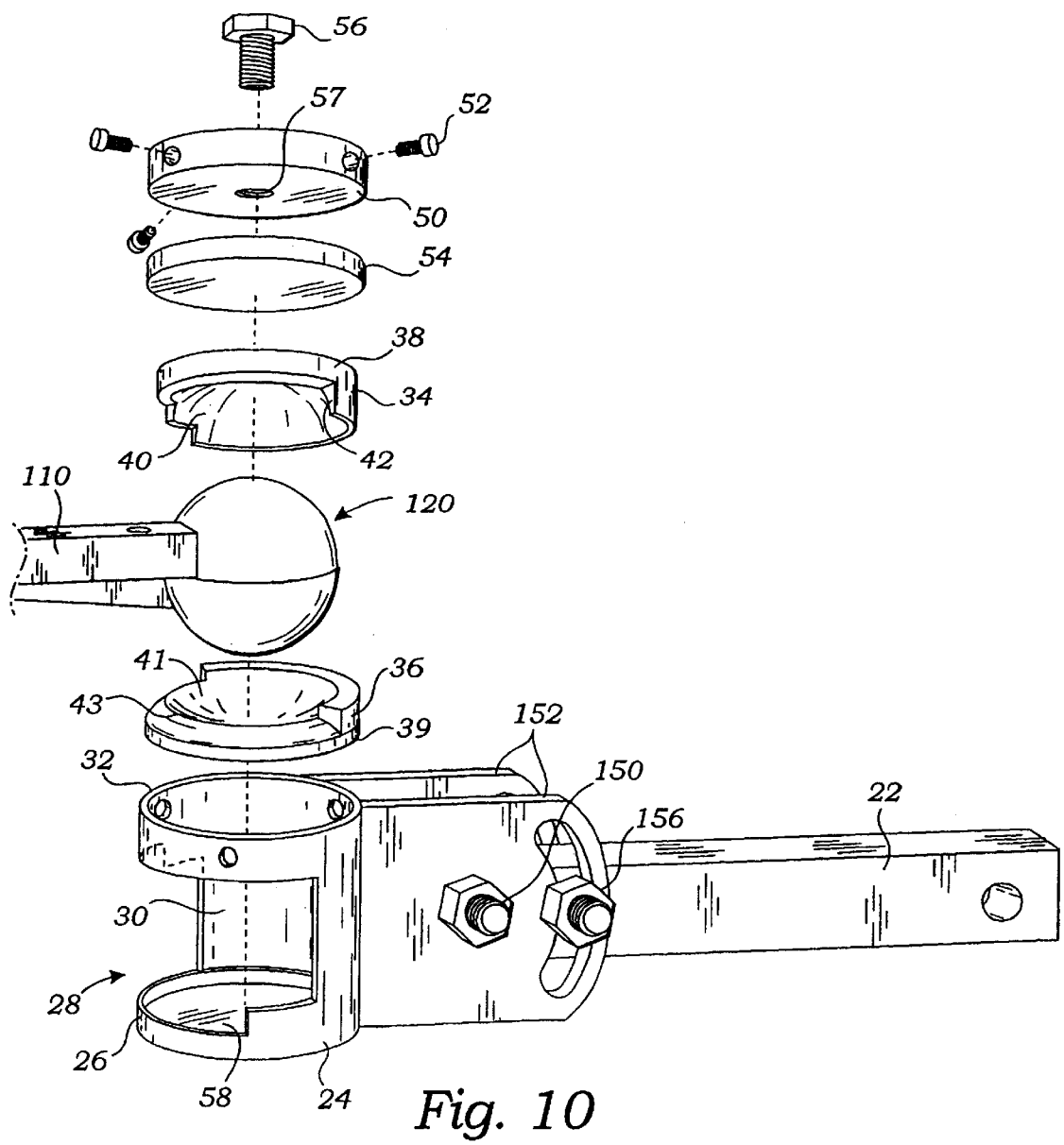
FIG. 10 is an exploded rear perspective view thereof.

In a second embodiment, as shown in FIGS. 9 and 10, the hitch socket member 24 further includes a hitch socket top aperture 32, a top socket bearing element 34, and a bottom socket bearing element 36. The top and bottom socket bearing elements 34 and 36 perform the function of contacting and containing the hitch ball member 120, so it is possible for the hitch socket central aperture 28 to be larger than the hitch ball member 120. The top and bottom socket bearing elements 34 and 36 are inserted into the hitch socket internal chamber 30 through the hitch socket top aperture 32, as described below.

The top and bottom socket bearing elements 34 and 36 have top and bottom hitch socket outside surfaces 38 and 39, respectively, together shaped to fit within the hitch socket internal chamber 30 of the hitch socket member 24. The top and bottom socket bearing elements 34 and 36 further have top and bottom hitch socket inside bearing surfaces 40 and 41, respectively, that are together shaped to provide a bearing surface around at least part of a hitch ball member 120. The top and bottom hitch socket inside bearing surfaces 40 and 41 are preferably concave and extend around enough of the hitch ball member 120 far enough to securely lock the hitch ball member 120 within the hitch socket member 24 with enough strength to withstand the rigors of towing. The top and bottom socket bearing elements 34 and 36 preferably further provide top and bottom socket bearing slots 42 and 43, respectively, that together enable each of the pair of tow bars 110, but not the hitch ball member 120, to escape from within the hitch socket internal chamber 30.

As shown in FIG. 10, the bottom socket bearing element 36 is first inserted into the hitch socket internal chamber 30 through the hitch socket top aperture 32, the bottom socket bearing element 36 resting upon a bottom surface 58 of the hitch socket member 24. The hitch ball member 120 is inserted through the hitch socket central aperture 28 and into the hitch socket internal chamber 30, the hitch ball member 120 being positioned on the bottom hitch socket inside bearing surface 41. The top socket bearing element 34 is then inserted into the hitch socket internal chamber 30 through the hitch socket top aperture 32, the top socket bearing element 34 being positioned on top of the hitch ball member 120 such that the top hitch socket inside bearing surface 40 contacts and contains the hitch ball member 120.

Finally, a locking plate 50 is positioned over the hitch socket top aperture 32 to lock the hitch ball member 120 and the top and bottom socket bearing elements 34 and 36 in place. The locking plate is preferably a steel disk shaped to fit within the hitch socket top aperture 32 where it is locked in place with a plurality of locking bolts 52. Various alternative embodiments, of course, can be devised. The embodiments used on the pair of socket members 60, such as the cap portion 80, are illustrative of various embodiments that may be employed and which should be considered equivalent to the present invention.

In the preferred embodiment, the locking plate 50 includes a means for compressing the top and bottom socket bearing elements 34 and 36 against the hitch ball member 120. The means for compressing is preferably an adjustable compression plate 54 positioned between the locking plate 50 and the top socket bearing element 34. An adjustment bolt 56 is preferably positioned through, and threadedly engaged with, an adjustment bolt aperture 57 of the locking plate 50, such that the adjustment bolt 56 depresses the compression plate 54 when tightened.

It is, of course, equivalent to reverse the location of the compression plate 54 within the hitch socket member 24, such that the compression plate 54 is located between the bottom surface 58 and the bottom socket bearing element 36. Those skilled in the art can also devise countless equivalent screws, levers, and other mechanisms to compress the top and bottom socket bearing elements 34 and 36 against the hitch ball member 120 as described herein, and these alternative embodiments should be considered within the scope of the described claims.

In the second embodiment of the hitch socket member 24, the preferred embodiment, the hitch socket central aperture 28 must be larger than the hitch ball member 120 to allow the insertion described above. In this embodiment, the top and bottom socket bearing elements 34 and 36 must contain the hitch ball member 120.

In a third embodiment of the hitch socket member 24 (not shown), the hitch ball member 120 is inserted into the hitch socket internal chamber 30 through the hitch socket top aperture 32. This embodiment is similar to the pair of socket elements 60 described below. In this embodiment, the hitch socket top aperture 32 must communicate with the hitch socket central aperture 28 to enable insertion. The benefit of this embodiment is that the hitch socket central aperture 28 can be smaller than the hitch ball member 120, so that the hitch socket member 24 functions to assure that the hitch ball member 120 does not escape through the hitch socket central aperture 28.

Pair of Tow Bars

Figure 2:
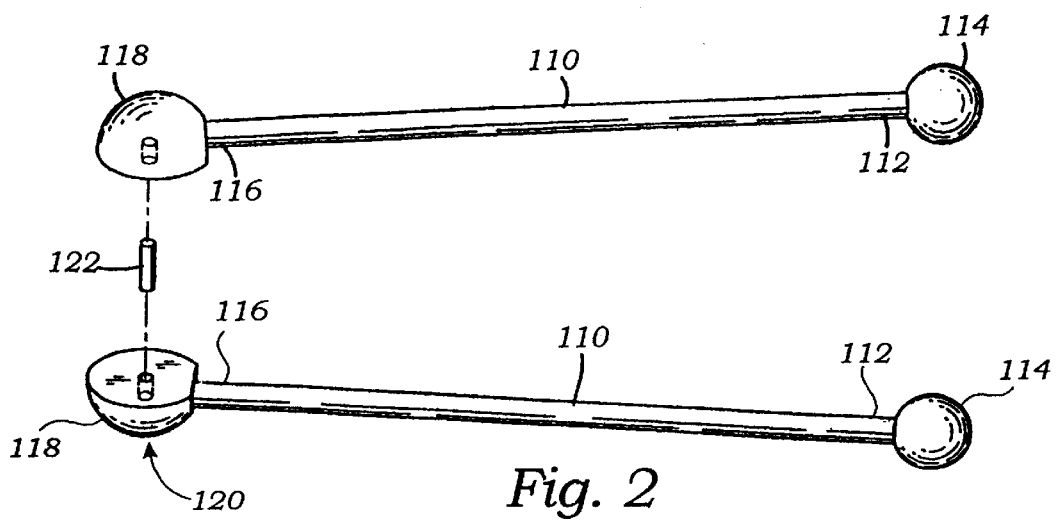
FIG. 2 is an exploded perspective view of a pair of tow bars.

As shown in FIG. 1, the tow bar apparatus 10 includes a pair of tow bars 110 for connecting the hitch member 20 to the pair of socket members 60. In a first embodiment, as shown in FIG. 2, each of the pair of tow bars 110 is an elongate bar having a first end 112 and a second end 116. The pair of tow bars 110 must be rigid and strong enough to withstand the rigors of towing. The pair of tow bars 110 are preferably constructed of steel or similar high-strength material.

As shown in FIG. 2, the first end 112 of each of the pair of tow bars 110 has a plate ball member 114, preferably a steel ball such as is commonly used in ball-and-socket joints. In an alternative embodiment, however, the plate ball member 114 might be constructed of hard plastic, in which case the top and bottom bearing elements 90 and 92 are not required. In yet another alternative embodiment, however, the first end 112 might have another mechanism for attaching the pair of tow bars 110 to the towed vehicle 16, the mechanisms including any of the mechanisms shown in the prior art listed above and incorporated by reference.

The second ends 116 of the pair of tow bars 110 are joined together to form a hitch ball member 120. The hitch ball member 120 is shaped to be pivotally and rotatably engaged within the hitch socket internal chamber 30 of the hitch socket member 24 such that each of the pair of tow bars 110 extends out of the hitch socket internal chamber 30 through the hitch socket central aperture 28 but the hitch ball member 120 is locked within the hitch socket internal chamber 30 by either the hitch socket peripheral lip 26 or the top and bottom socket bearing elements 34 and 36.

The second end 116 of each of the pair of tow bars 110 preferably includes a hemisphere 118, the hemispheres 118 of the pair of tow bars 110 interlocking to form the hitch ball member 120. The hitch ball member 120 is preferably pivotally and rotatably engaged between the top and bottom socket bearing elements 34 and 36 within the hitch socket internal chamber 30, as described above, such that each of the pair of tow bars 110 extends through the hitch socket central aperture 28. While it is preferred that the pair of tow bars 110 each include a hemisphere 118 that is half of a sphere, for purposes of this application this term includes the various alternative shapes that together form a generally round hitch ball member 120 that is capable of forming a functional ball and socket connection with the hitch socket member 24.

As shown in FIGS. 2–5, the hitch ball member 120 preferably further includes a pivot pin 122 that pivotally locks the two hemispheres 118 together. This construction allows the pair of tow bars 110 to pivot with respect to each other, thereby enabling the tow bar apparatus 10 to collapse when not in use for easier storage, and then fold back open for use. The pivot pin 122 also prevents the two hemispheres 118 from sliding against each other and potentially enabling the hitch ball member 120 to escape from the hitch socket member 24.

Pair of Socket Members

The first end of each of the pair of tow bars 110 includes a means for removably engaging the first end 112 of each of the pair of tow bars 110 to the towed vehicle 16. As shown in FIG. 1, the means for removably engaging is preferably the pair of socket members 60. Each of the pair of socket members 60 is adapted to be attached to the towed vehicle 16 for providing an attachment point for the pair of tow bars 110 to the towed vehicle 16.

As shown in FIGS. 1 and 3–5, each of the pair of socket members 60 preferably includes a base portion 62 having a sidewall 70 shaped to define an internal chamber 72 and a top aperture 64 that is shaped to removably receive the plate ball member 114 of one of the pair of tow bars 110. The sidewall 70 further defines a bar slot 66. The bar slot 66 preferably extends from the top aperture 64 into the sidewall 70, the bar slot 66 being shaped to receive the one of the pair of tow bars 110 when the plate ball member 114 is inserted into the internal chamber 72. The bar slot 66 is preferably smaller than the diameter of the plate ball member 114 to prevent the escape of the plate ball member 114 through the bar slot 66; however, if a bearing element similar to the top and bottom socket bearing elements 34 and 36 is used, it is possible for the bar slot 66 to have a larger diameter than the plate ball member 114.

Bearing Elements

Each of the pair of socket members 60 preferably includes one of a pair of plastic bearing elements. Each of the plastic bearing elements has an outside surface and a contoured inside surface. The outside surface is shaped to fit securely within the internal chamber 72 of one of the pair of socket members 60. The contoured inside surface is shaped to provide a bearing surface for the plate ball member 114 when it is positioned within the internal chamber 72. It is important that the outside surface fit relatively securely against the socket member 60 because the plastic of the plastic bearing element is typically not strong enough to contain the plate ball member 114 by itself, but requires the underlying support provided by the socket member 60. It is important that the contoured inside surface securely engage the plate ball member 114 so that the plate ball member 114 does not slip out of the socket member 60. While it is possible to design a single plastic bearing element that will functionally support the plate ball member 114, it is preferred that the plastic bearing element be constructed of two parts so that they can be assembled around the plate ball member 114 for the tightest fit.

Figure 6:
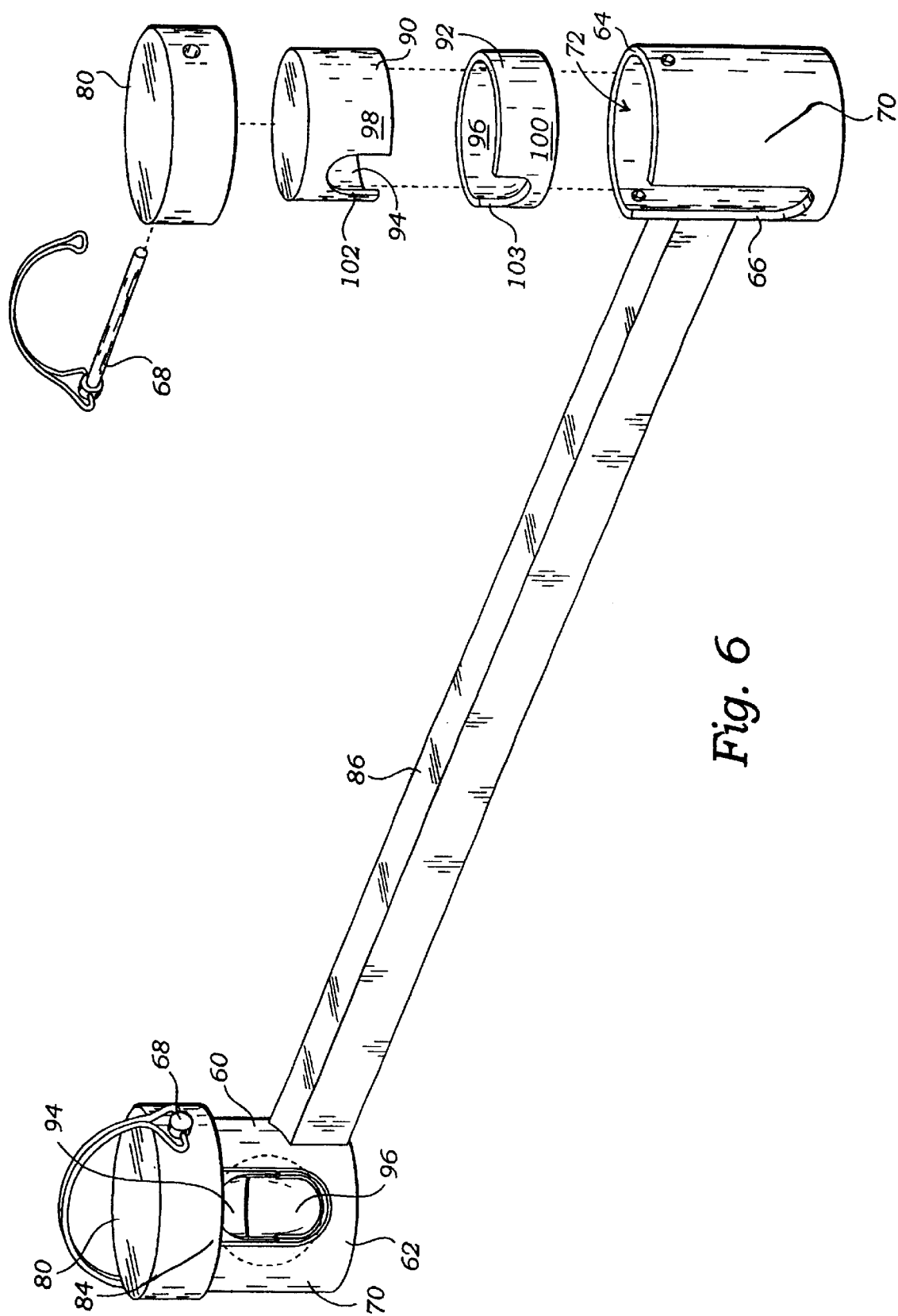
FIG. 6 is a perspective, partially exploded view of a tow plate having a pair of socket members, each of the pair of socket members including a top bearing element and a bottom bearing element.

As shown in FIG. 6, each of the plastic bearing elements preferably includes a top bearing element 90 and a bottom bearing element 92. The top bearing element 90 has a top contoured inside surface 94 and the bottom bearing element 92 has a bottom contoured inside surface 96, the top and bottom contoured inside surfaces 94 and 96 cooperating to provide a bearing surface around the plate ball member 114 when it is positioned within the internal chamber 72. The top bearing element 90 has a top outside surface 98 and the bottom bearing element 92 has a bottom outside surface 100, the top and bottom outside surfaces 98 and 100 cooperating to fit securely within the internal chamber 72. The top and bottom bearing elements 90 and 92 preferably provide top and bottom bearing slots 102 and 103, respectively, that together enable the tow bar 110 but not the plate ball member 114 to escape from within the top and bottom contoured inside surfaces 94 and 96.

Cap Portion

Each of the pair of socket members 60 preferably includes a means for blocking the top aperture 64 to prevent the plate ball member 114 from escaping from the internal chamber 72. As shown in FIGS. 1 and 6, the means for blocking the top aperture 64 preferably includes a pair of cap portions 80, each of the pair of cap portions 80 being shaped to fit over and block the top aperture 64 to removably lock the plate ball member 114 within the one of the pair of socket members 60.

Each of the pair of cap portions 80 includes a means for locking each of the pair of cap portion 80 onto one of the pair of socket members 60. The means for locking is preferably at least one locking pin 68 that fits through the sidewall 70 and into the cap portion 80; however, those skilled in the art can devise alternative pins, screws, locking arms, and hinges to removably attach the cap portion 80 to the sidewall 70.

Each of the pair of cap portions 80 preferably includes an annular flange 84 that extends downwardly from the cap portion 80 to cover the top aperture 64 and fit snugly around the sidewall 70. The annular flange 84 not only serves to position the cap portion 80 on the socket member 60, it also serves to removably close the top of the bar slot 66, thereby providing additional structural integrity to the socket member 60.

The pair of socket members 60 are preferably operably positioned and laterally spaced by a tow plate 86. The tow plate 86 is adapted to be fixedly attached to the towed vehicle 16, preferably by fastening the tow plate 86 to the towed vehicle 16 with bolts, or by welding the tow plate 86 to the undercarriage of the towed vehicle 16. The tow plate 86, which must be rigid and strong, is preferably constructed of steel.

Means for Adjusting the Length of the Pair of Tow Bars

The tow bar apparatus preferably further includes a means for adjusting the length of each of the pair of tow bars 110. Each of the pair of tow bars 110 preferably includes a first portion 124 forming the first end 112 of the tow bar 110, and a second portion 126 forming the second end 116 of the tow bar 110. The first portion 124 is telescopically engaged with the second portion 126. The first and second portions 124 and 126 preferably include a means for preventing disengagement between the first portion 124 and the second portion 126; and wherein the means for adjusting the length of each of the pair of tow bars 110 includes a locking element 132 that removably engages both the first and second portions 124 and 126 to prevent movement of the first portion 124 with respect to the second portion 126.

As shown in FIG. 7, the means for preventing disengagement is preferably a first shim 128 in the first portion 124 and a second shim 130 in the second portion 126, the first shim 128 lockingly engaging the second shim 130 to prevent the first portion 124 from sliding out of the second portion 126. The means for adjusting the length of each of the pair of tow bars 110 preferably includes a pivot point 134 fixedly attached to the second portion 126, the locking element 132 being pivotally attached to the pivot point 134 for pivoting the locking element 132 between a locked position, in which the locking element 132 lockingly engages a locking notch 136 of the first portion 124, and an unlocked position in which the locking element 132 does not engage the locking notch 136. The pivot point 134 preferably further includes a pivot locking pin 138 that engages a pin bore 139 adjacent the pivot point 134 to lock the locking element 132 in the locked position. Obviously, these elements can be reversed, or substituted with equivalent mechanisms, and such equivalent designs should be considered within the scope of the claims described below.

In an alternative embodiment, as shown in FIG. 8, the means for adjusting the length of each of the pair of tow bars 110 is provided by a pair of position locking bolts 140 than lockingly engage each of the first portion 124 and the second portion 126. Obviously, combinations of these features, as well as a variety of locking arms, locking bolts, spring loaded pins, and other mechanisms can be devised by those skilled in the art, and such modifications should be considered equivalent to the structures described herein.

As shown in FIGS. 9 and 10, the hitching portion 22 is preferably pivotally connected to the hitch socket member 24 with a means for pivoting the hitching portion 22 with respect to the hitch socket member 24. The means for pivoting is preferably provided by a hitch member pivot bolt that pivotally locks the hitching portion 22 between a pair of pivot flanges 152 that extend forward of the hitch socket member. Each of the pair of pivot flanges 152 further includes a curved slot 154 shaped to slidably receive a positioning and locking bolt 156 that can be used to removably lock the hitching portion 22 at a given angle with respect to the hitch socket member 24.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A tow bar apparatus for use by a towing vehicle to tow a towed vehicle, the tow bar apparatus comprising:
   a hitch member having a hitching portion and a hitch socket member, the hitching portion being adapted to be attached to the towing vehicle, the hitch socket member having a peripheral lip that defines a central aperture that communicates with an internal chamber of the hitch socket member;
   a pair of tow bars, each of the pair of tow bars having a first end and a second end, each of the pair of tow bars having a plate ball member at the first end;
   the second ends of each of the pair of tow bars being attached to a hitch ball member, the hitch ball member being adapted to be pivotally and rotatably engaged within the internal chamber of the hitch socket member such that each of the pair of tow bars extends out of the internal chamber through the central aperture but the hitch ball member is locked within the internal chamber;
   a pair of socket members adapted to be attached to the towed vehicle, each of the pair of socket members including a base portion that includes a sidewall shaped to define an internal chamber, the sidewall defining a top aperture that is shaped to removably receive the plate ball member of one of the pair of tow bars, the sidewall further defining a bar slot that extends from the top aperture into the sidewall, the bar slot being shaped to receive the one of the pair of tow bars when the plate ball member is inserted into the internal chamber, but the bar slot being too small to allow the plate ball member to escape through the bar slot; and
   a means for blocking the top aperture of each of the pair of socket members to prevent the plate ball member from escaping from the internal chamber through the top aperture.

2. The tow bar apparatus of claim 1 wherein the means for blocking the top aperture each of the pair of socket members includes a pair of cap portions, each of the pair of cap portions being shaped to block the top aperture of one of the pair of socket members to removably lock the plate ball member within the internal chamber of one of the pair of socket members, each of the pair of cap portions having a means for locking each of the pair of cap portions onto one of the pair of socket members, each of the pair of cap portions further including an annular flange that extends downwardly from the cap portion to cover the top aperture and fit snugly around the sidewall.

3. The tow bar apparatus of claim 1 further comprising a tow plate, the tow plate being fixedly attached to each of the pair of socket members to operably position and laterally space the pair of socket members, the tow plate being adapted to be mountable upon the towed vehicle.

4. The tow bar apparatus of claim 1 further comprising a pair of plastic bearing elements, each of the plastic bearing elements having an outside surface and a contoured inside surface, the outside surface being shaped to fit within the internal chamber of one of the pair of socket members, the contoured inside surface being shaped to provide a bearing surface for the plate ball member that is positioned within the internal chamber.

5. The tow bar apparatus of claim 4 wherein each of the plastic bearing elements includes a top bearing element and a bottom bearing element, the top bearing element having a top contoured inside surface, the bottom bearing element having a bottom contoured inside surface, the top and bottom contoured inside surfaces cooperating to provide a bearing surface around the plate ball member when it is positioned within the internal chamber.

6. The tow bar apparatus of claim 1 further comprising a means for adjusting the length of each of the pair of tow bars.

7. The tow bar apparatus of claim 6 wherein each of the pair of tow bars includes a first portion forming the first end of the tow bar, and a second portion forming the second end of the tow bar, the first portion being telescopically engaged with the second portion, and further including a means for preventing disengagement between the first portion and the second portion once they are telescopically engaged; and wherein the means for adjusting the length of each of the pair of tow bars includes a locking element that removably engages both the first and second portions to prevent movement of the first portion with respect to the second portion.

8. The tow bar apparatus of claim 7 wherein the means for adjusting the length of each of the tow bars includes:

a pivot point fixedly attached to the second portion, the locking element being pivotally attached to the pivot point for pivoting the locking element between a locked position in which the locking element lockingly engages a locking notch of the first portion, and an unlocked position in which the locking element does not engage the locking notch; and a pivot locking pin that engages a pin bore adjacent the pivot point to lock the locking element in the locked position.

* * * * *